United States Patent [19]

Miller et al.

[11] Patent Number: 5,017,206

[45] Date of Patent: May 21, 1991

[54] METHOD OF PROVIDING A 1XN FIBER OPTIC COUPLER

[75] Inventors: William J. Miller; Daniel A. Nolan; Gregory E. Williams, all of Corning, N.Y.

[73] Assignee: Corning Incorporated, Corning, N.Y.

[21] Appl. No.: 461,054

[22] Filed: Jan. 4, 1990

[51] Int. Cl.$^5$ .............................................. C03C 25/02
[52] U.S. Cl. ........................................ 65/3.11; 65/4.2; 65/4.21; 350/96.15
[58] Field of Search ................. 65/2, 3.11, 3.2, 4.2, 65/4.21, 4.3, 12, 109, 110, 157, 292, 374.15; 350/96.15

[56] References Cited

U.S. PATENT DOCUMENTS

| | | | |
|---|---|---|---|
| 3,579,316 | 5/1971 | Dyott et al. | 65/4.21 |
| 4,291,940 | 9/1981 | Kawasaki et al. | 65/4.2 |
| 4,377,403 | 3/1983 | McLandrich | 65/3.11 |
| 4,392,712 | 7/1983 | Ozeki | 350/96.15 |
| 4,426,215 | 1/1984 | Murphy | 65/4.21 |
| 4,439,221 | 3/1984 | Smyth et al. | 65/4.21 |
| 4,449,781 | 5/1984 | Lightstone et al. | 350/96.15 |
| 4,490,163 | 12/1984 | Jochem et al. | 65/4.21 |
| 4,591,372 | 5/1986 | Bricheno et al. | 65/4.2 |
| 4,704,151 | 11/1987 | Keck | 65/163 |
| 4,726,643 | 2/1988 | Imoto et al. | 350/96.21 |
| 4,750,926 | 6/1988 | Berkey | 65/23 |
| 4,773,924 | 9/1988 | Berkey | 65/4.2 |
| 4,799,949 | 1/1989 | Keck et al. | 65/31 |
| 4,902,323 | 2/1990 | Miller et al. | 65/3.11 |
| 4,902,324 | 2/1990 | Miller et al. | 350/96.15 |
| 4,906,068 | 3/1990 | Olson et al. | 350/96.2 |
| 4,915,467 | 4/1990 | Berkey | 350/96.15 |
| 4,925,269 | 5/1990 | Serivener | 350/96.15 |
| 4,931,076 | 6/1990 | Berkey | 65/4.21 |
| 4,932,740 | 6/1990 | Berkey et al. | 350/96.33 |

FOREIGN PATENT DOCUMENTS

| | | |
|---|---|---|
| 58-91403 | 5/1983 | Japan . |
| 59-195615 | 11/1984 | Japan . |
| 63-217313 | 9/1988 | Japan . |
| 0121404 | 1/1989 | Japan . |

OTHER PUBLICATIONS

Dyott et al., Polarization Holding Directional Couplers Using D Fiber, Society of Photo—Optical Instrumentation Engineers, vol 479, 1984, pp. 23–27.

Primary Examiner—Kenneth M. Schor
Assistant Examiner—John J. Bruckner
Attorney, Agent, or Firm—William J. Simmons, Jr.

[57] ABSTRACT

A fiber optic coupler is formed by assembling a coupler preform having two concentric glass tubes having a gap between them. The shape and/or size of the inner tube relative to the shape and/or size of the outer tube is such that a plurality of output optical fibers can be equally spaced in the gap. An input optical fiber is disposed in an aperture in the inner tube. The input and output fibers extend through the midregion of the resultant coupler preform. The midregion is heated to collapse it about the fibers, and the central portion of the midregion is stretched to reduce the diameter over a predetermined length.

16 Claims, 2 Drawing Sheets

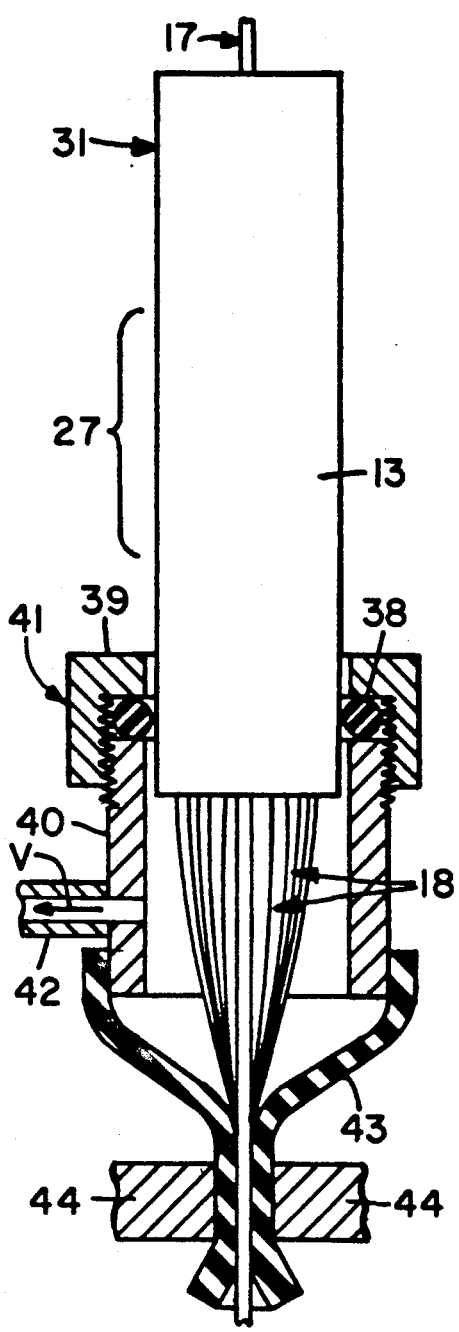
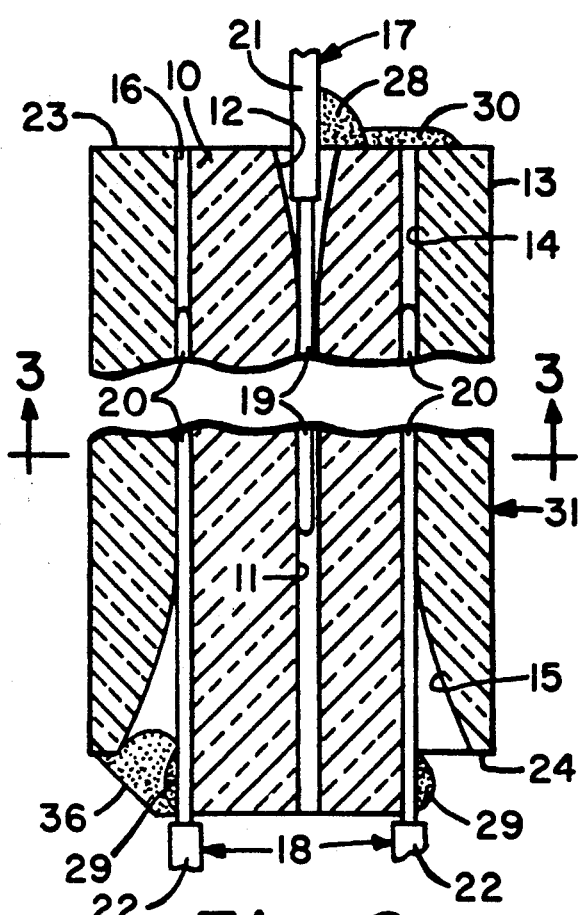
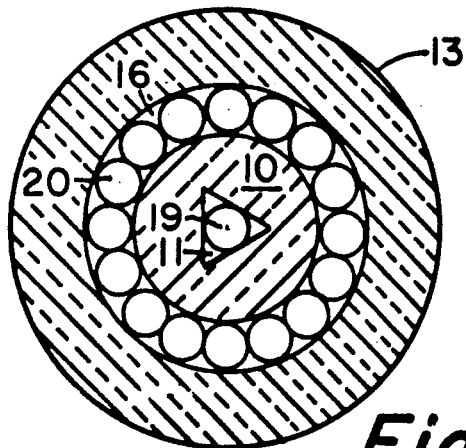
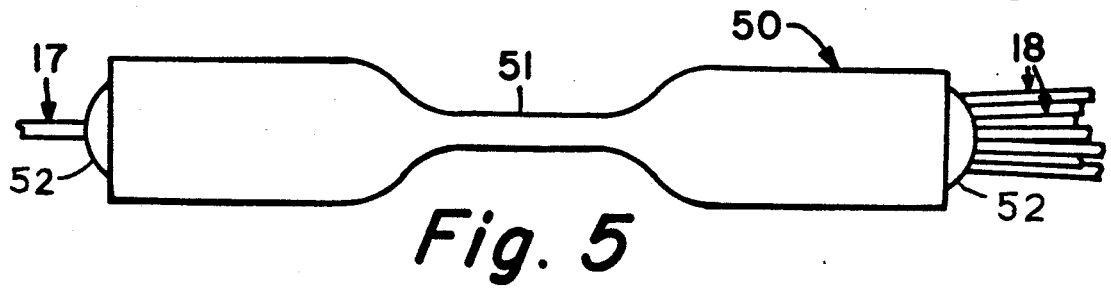
Fig. 1
Fig. 2
Fig. 3
Fig. 5

METHOD OF PROVIDING A 1XN FIBER OPTIC COUPLER

CROSS-REFERENCE TO RELATED APPLICATION

This application is related to the following U.S. Pat. Applications: Ser. No. 223,423 entitled "Method of Reproducibly Making Fiber Optic Coupler" (W. J. Miller et al. 1-2) filed Jul. 25, 1988 now U.S. Pat. No. 4,902,324; U.S. Pat. Ser. No. 380,877 entitled "Method of Making Fiber Optic Couplers" (G. E. Berkey et al. 18-1-1) filed Jul. 17, 1989; and U.S. Pat. Ser. No. 461,100 entitled "Method of Making 1×N Fiber Optic Coupler" (D. A. Nolan et al. 10-2) filed on even date herewith.

BACKGROUND OF THE INVENTION

This invention relates to 1×N fiber optic couplers (N>2) that are capable of coupling substantially equal amounts of power from an input optical fiber to three or more output optical fibers; it also relates to methods of making such couplers.

Methods of making 1×N couplers are disclosed in said related U.S. Pat. application Ser. No. 380,877. Protective coating is removed from a region of an input optical fiber intermediate the ends thereof, and protective coating is removed from an end of each of a plurality of output optical fibers. The coated portion of the input fiber is threaded through the aperture of a capillary tube until the uncoated region thereof is near the tube end. The uncoated regions of the output fibers are placed around that of the input fiber, and the uncoated regions of all of the fibers are simultaneously fed into the tube aperture until the uncoated regions extend through the midregion of the tube. In order to equally space the output fibers around the input fiber, the uncoated sections of the output fibers are glued to the input fiber prior to inserting the fiber bundle into the tube. The tube midregion is heated to collapse it about the fibers, and the central portion of the midregion is drawn to reduce the diameter thereof over a predetermined length.

Said related U.S. Pat application Ser. No. 223,423 teaches that tubes having bores of predetermined cross-section can be employed to facilitate the alignment of the output fibers around the centrally-disposed input fiber prior to the tube collapse step. The aperture is formed by a plurality of flattened walls, the dimensions and orientations of which are such that the cross-section of the aperture in the central region of the tube is symmetrical with respect to a plane passing through the longitudinal axis of the tube. At any cross-section of the aperture that is adjacent the coated regions of the fibers, each fiber coating contacts two walls of the aperture. The midregion of the tube is heated and collapsed about the fibers, and the central portion of the midregion is drawn to reduce the diameter thereof. For example, four fibers can be positioned in a triangularly shaped bore, three of the fibers being equally spaced about a central fiber. After the tube collapse step, the peripherally disposed fibers are not always equally spaced about the central fiber. A maximum of six fibers can be equally spaced about the central fiber and yet be in contact with the central fiber.

SUMMARY OF THE INVENTION

It is an object of the present invention to provide a method of making an overclad 1×N fiber optic coupler (N>2) wherein a plurality of output fibers remain equally spaced about an input fiber after the overclad tube has been collapsed onto the fibers. Another method is to provide a reproducible method of making 1×N overclad fiber optic couplers. A further method is to provide a fiber optic coupler in which a plurality of output fibers are equally spaced about an input fiber.

Briefly, the present method comprises the following steps. There is assembled a coupler preform having inner and outer concentric glass tubes having a gap therebetween. A first optical fiber is disposed in an aperture in the inner tube, and a plurality of output optical fibers is disposed within the gap and equally spaced about the axis of the inner tube. The first fiber and the plurality of fibers extend through the midregion of the resultant coupler preform. The first fiber, which constitutes the input fiber, and the plurality of output fibers extend from opposite ends of the preform. The midregion of the coupler preform is collapsed onto the fibers, and the central portion of the midregion is stretched to reduce the diameter thereof.

Various gap configurations are generated, depending upon the shape of the outer surface of the inner tube and the shape of the outer tube aperture. The gap can be azimuthally homogeneous, whereby its thickness at any azimuthal position is sufficient to accept one of the plurality of fibers. In such a gap, each of the output fibers is disposed immediately adjacent two other output fibers. Alternatively, the gap can be azimuthally inhomogeneous, whereby the thickness thereof at equally spaced azimuthal positions is sufficient to accept one of the plurality of fibers, but wherein the thickness of the gap between the spaced azimuthal positions is insufficient to accept one of the plurality of fibers.

The coupler preform can be assembled by inserting a portion of the input fiber into the axially disposed aperture of an inner tube having first and second ends, the remainder of the first fiber extending from the first end of the inner tube. The inner tube is inserted into the aperture of an outer tube, a gap existing between the inner and outer tubes. The ends of a plurality of output optical fibers are inserted into the gap. The input and output fibers extend through the midregion of the resultant coupler preform. The inner tube is preferably formed of a glass having a softening point temperature lower than that of the optical fiber cladding glass and having a refractive index substantially equal to that of the cladding glass. The outer tube is formed of a glass having a refractive index less than that of the optical fiber cladding glass. The softening point temperature of the outer tube is preferably lower than that of the inner tube.

An azimuthally inhomogeneous gap can be formed as follows. The aperture of the outer tube may contain a plurality of equally spaced, inwardly projecting, longitudinally extending protrusions. Alternatively, the outer surface of the inner tube may contain such protrusions. In either case, one of the output fibers is inserted into the gap between each adjacent pair of protrusions. An alternative method of providing an azimuthally inhomogeneous gap involves the use of an inner tube having a circularly cylindrical outer surface and an outer tube having an aperture which is formed of a plurality of surfaces equal in number to the number of output fibers, the cross-sectional configuration of the outer tube aperture being that of a regular polygon.

The inner tube is preferably slightly longer than the outer tube so that, after it is inserted into the aperture of the outer tube, it extends beyond the outer tube. If the method employs output optical fibers having protective coatings thereon, a portion of the coating is stripped from an end of each fiber. In the resultant coupler preform, the coated portions of the output fibers terminate beyond the protruding second end of the inner tube, and the fibers are glued to the protruding portion of the inner tube.

The resultant fiber optic coupler comprises an elongated glass body having a solid midregion and first and second opposite end portions which respectively extend from the midregion to the first and second ends thereof. The body comprises an inner region of a first glass composition having a refractive index $n_3$ and an outer region of a second glass composition having a refractive index $n_4$ ($n_4 < n_3$). A first glass optical fiber extends axially through the midregion of the body and extends beyond the first end thereof. The output optical fibers extend through the midregion of the body and extend beyond the second end thereof. The output fibers are situated between the inner and outer regions of the body and are substantially equally spaced around the input fiber. The refractive index of the claddings of the fibers is about equal to $n_3$. The central portion of the midregion has a diameter smaller than the diameter of the remainder of the glass body, and the cores of the optical fibers are closer together in the central portion of the midregion than in the remainder of the glass body. Each of the output fibers can be in contact with the two adjacent output fibers, or it can be separated from the two adjacent output fibers.

BRIEF DESCRIPTION OF THE DRAWINGS

FIG. 1 is a partial cross-sectional view of a coupler preform attached to an evacuation apparatus.

FIG. 2 is a cross-sectional view of the preform of FIG. 1.

FIG. 3 is a cross-sectional view taken along lines 3—3 of FIG. 2.

FIG. 5 shows a coupler preform after it has been stretched and sealed at its ends.

DESCRIPTION OF THE PREFERRED EMBODIMENTS

Figure 4:
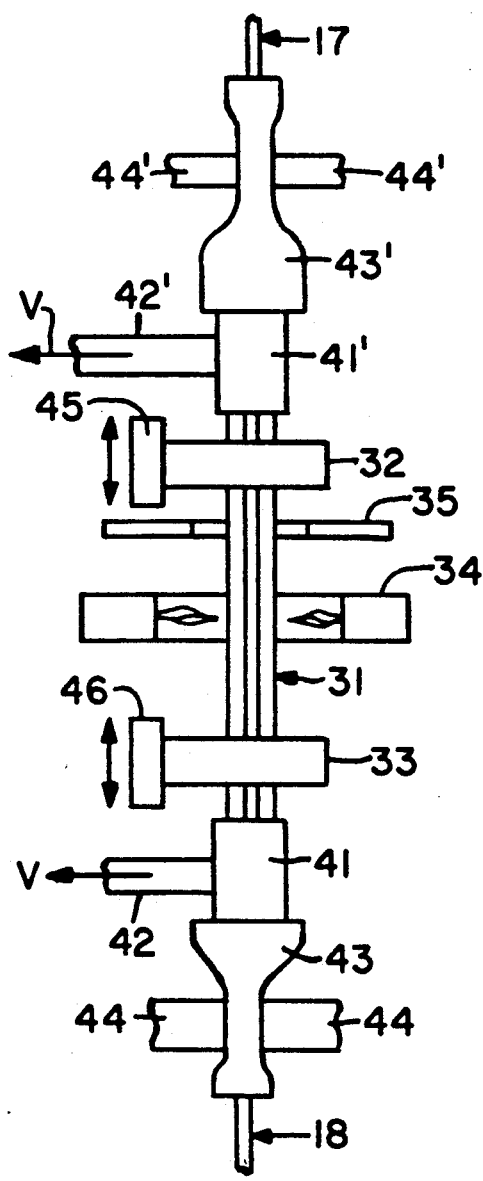
FIG. 4 is a schematic illustration of an apparatus for collapsing a coupler preform and drawing the midregion thereof.
Figure 6:
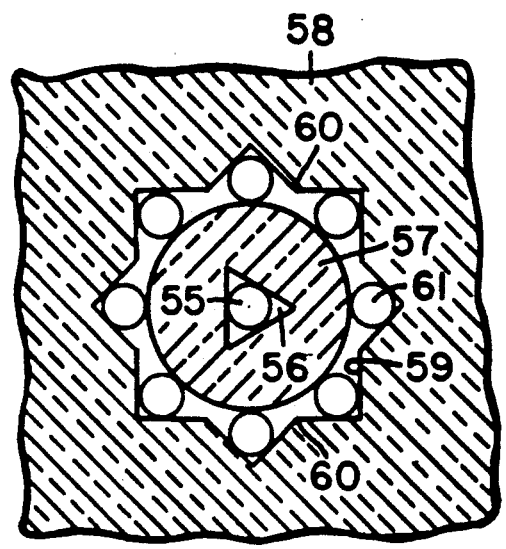
FIGS. 6, 7, 8 and 9 are cross-sectional views illustrating alternative embodiments.

The drawings are not intended to indicate scale or relative proportions of the elements shown therein.

By way of example, FIGS. 1-3 illustrate a method of assembling a coupler preform 31 that can be formed into a 1×16 fiber optic coupler.

A plurality of lengths of coated optical fiber are severed from a reel of fiber. Each of the coated fibers consists of a glass fiber having a protective coating, and each glass fiber comprises a core of refractive index $n_1$ and a cladding having a refractive index $n_2$ ($n_1 > n_2$). The coating is removed from the end of each of the coated fibers, and each of the uncoated ends is optionally provided with an antireflection termination. One method of forming such terminations is disclosed in U.S. Pat. No. 4,834,493. In accordance with a modification of the method of that patent, an oxygen-acetylene flame is directed at the uncoated fiber a short distance from the end thereof, and the end of the fiber is pulled until it becomes severed from the remainder of the fiber. The fiber now has a tapered end. The fiber end remote from the tapered end is connected to a reflectance monitoring apparatus. The tapered end is provided with a low reflectance termination by heating the tapered end in a flame to lower the viscosity of the material thereof by an amount sufficient to cause the material to recede back along the fiber and form a rounded endface, the final diameter of which is about equal to or slightly smaller than the original uncoated fiber diameter. A current specification for the reflected power is −50 dB. The uncoated sections of fiber are sufficiently long that they extend beyond the tube midregion 27 when the ends of the coating are positioned as described below. When so positioned, the fiber ends preferably do not extend beyond endfaces 23 and 24 of tube 13.

The present method employs concentric tubes 10 and 13 having longitudinal bores or apertures 11 and 14, respectively. The diameter of aperture 14 is sufficiently large as compared to the diameter of inner tube 10 that an annular gap 16 exists therebetween when the tubes are arranged concentrically. Gap 16 is azimuthally homogeneous, whereby its thickness at any azimuthal position is a predetermined thickness that is just large enough to accept one of said plurality of fibers. Thus, sixteen fibers can be disposed therein in side-by-side relationship, each of the fibers 20 being immediately adjacent two others of the fibers 20. The dimensions of the tubes are determined as follows. For ease of handling, the tube lengths should be at least about 3.8 cm. Inner tube 10 preferably extends beyond the outer overclad tube 13 about 6–7 mm to facilitate the gluing of fibers to the end portion of tube 10. Assuming that a standard fiber diameter of 125 μm is to be employed for fibers 19 and 20, the minimum cross-sectional dimension of each wall of triangular aperture 11 is about 168 μm. About 1–2 μm tolerance should be added to that dimension. If 16 optical fibers are arranged as illustrated in FIG. 3, their centers lie on a circle the diameter of which is about 637 μm. The maximum diameter of tube 10 is therefore about 512 μm, and the minimum diameter of aperture 14 is about 762 μm. Depending on the tolerence with which the fibers can be manufactured, the dimensions of tube 10 and aperture 14 must be modified to ensure that gap 16 is large enough to receive the 16 fibers.

Tubes 10 and 13 can be formed by depositing glass particles on a cylindrical mandrel to form a cylindrical porous preform. The mandrel is removed, and the porous preform is dried and consolidated to form a tubular glass body which is heated and redrawn to reduce its diameter. Apertures of various cross-sectional shapes can be formed in the tube by shrinking the tube onto a carbon graphite member of desired cross-section and then burning out the carbon member and stretching the tube to decrease its diameter. The carbon member surface should be free from impurities that would cause imperfections in the glass surface within the aperture. The details of this process are disclosed in U.S. Pat. No. 4,750,926, which is incorporated herein by reference. Although aperture 11 could be circular, its cross-sectional shape is preferably triangular, square or the like to facilitate its evacuation. Aperture 14 could also be formed by shrinking a tube onto a carbon member.

Tapered apertures 12 and 15 can be formed by flowing the gas phase etchant NF$_3$ through the tube while directing a flame toward the end of the tube to create an axial temperature gradient. The tapered apertures form funnel-like entrances to bore 11 and gap 16 to facilitate fiber insertion.

The refractive index $n_3$ of tube 10 is about the same as $n_2$, and that tube is softer than the fiber cladding glass so that it does not excessively deform the fibers during the tube collapse step. If the fiber cladding is SiO$_2$, suitable tube compositions are SiO$_2$ doped with a combination of refractive index increasing and decreasing dopants. For example, the addition of dopants such as GeO$_2$ to SiO$_2$ increases the refractive index thereof, whereas the addition of fluorine and/or B$_2$O$_3$ to SiO$_2$ decreases its refractive index. All of these dopants lower the softening point temperature of SiO$_2$.

The refractive index $n_4$ of overclad tube 13 is lower than $n_2$, and that tube is also softer than the fiber cladding glass and preferably softer than tube 10. Suitable tube compositions are SiO$_2$ doped with 1 to 25 wt. % B$_2$O$_3$ and SiO$_2$ doped with 0.1 to approximately 2.5 wt. % fluorine. Glasses comprising silica and combinations of these dopants can also be employed.

Following is a typical example of a method that could be employed in the formation of a 1×16 coupler. One of the aforementioned coated fibers is employed as input coated fiber 17, which comprises glass fiber 19 and protective coating 21. Fiber 19 is wiped to eliminate residual material and is inserted through tapered aperture 12 and into aperture 11 until its endface is located beyond the midregion of that tube. Coating 21 may extend into the tapered aperture, but it could be located a few millimeters beyond endface 23. A drop 28 of glue is applied to one side of coated fiber 17 in such a manner that access from endface 23 to aperture 11 is not blocked. Care must be taken not to contaminate the outer surface of tube 10. Tube 10 is then placed in tube 13 such that tapered aperture 15 is at endface 24 opposite tapered aperture 12.

In the described embodiment, sixteen of the aforementioned coated fibers are employed as output coated fibers 18, each of which comprises glass fiber 20 and protective coating 22. Fibers 20 are wiped and are inserted through tapered aperture 15 and into gap 16 until coating 22 is situated just beyond the end of tube 10. A drop 29 of glue is applied to the outer circumference of optical fibers 20 in such a manner that access from endface 24 to gap 16 is not blocked. Glue 29 secures the fibers to tube 10. Additional drops 30 and 36 of glue can be applied to endfaces 23 and 24, respectively, of tube 13 to secure the tubes together.

Apparatus for collapsing and stretching the resultant preform 31 is shown in FIG. 4. Chucks 32 and 33, which secure preform 31 in this apparatus, are mounted on motor controlled stages 45 and 46, respectively, which are preferably controlled by a computer. Heat shield 35 is optionally employed for the purpose of protecting the apparatus located above ring burner 34. Preform 31 is inserted through ring burner 34 and is clamped to the draw chucks. The fibers extending from both ends of tube 13 are threaded through their respective vacuum apparatus, and vacuum attachments 41 and 41' are connected to the ends of preform 31.

Vacuum attachment 41, which is shown in cross-section in FIG. 1, may comprise a tube 40, a collar 39 threaded thereon, and an O-ring 38 disposed between the collar and tube. After vacuum attachment 41 is slid over the end of tube 13, collar 39 is tightened, thereby compressing O-ring 38 against the tube. Vacuum line 42 is connected to tube 40. One end of a length of thin rubber tubing 43 is attached to that end of vacuum attachment 41 that is opposite preform 31; the remaining end of the tubing extends between clamp jaws 44. The coated portions of fibers 18 extend from tubing 43. Upper vacuum attachment 41' is similarly associated with line 42', tubing 43' and clamp jaws 44'. Vacuum is applied to both ends of coupler preform 31 by clamping jaws 44 and 44' on tubing 43 and 43', respectively.

The flame from ring burner 34 heats preform 31 for a period of time sufficient to increase the temperature of midregion 27 thereof to the softening temperature thereof. With the assistance of the differential pressure on the tubes, tube 10 collapses onto fiber 19, and tube 13 collapses onto fibers 20 and brings each fiber 20 into contact with the two adjacent fibers 20. The matrix glass of the two tubes surrounds the fibers and fills the apertures to form within midregion 27 a solid structure that is free from airlines. The longitudinal length of this collapsed region depends upon such parameters as the temperature and time duration of the flame, the thermal conductivity of the glass tube, and the amount of vacuum applied.

After the preform cools, the flame is reignited, and the center of the collapsed region is reheated to the softening point of the materials thereof. The heating period for the stretch step is usually of shorter duration than the collapse step. Thus, only the central portion of the collapsed midregion is stretched. Stretching only the central portion of the collapsed midregion ensures that the coupling region of the fibers will be embedded in the matrix glass of tubes 10 and 13. During this reheating step, the fibers are also heated since they are completely surrounded by the matrix glass of the capillary tube and are therefore in thermal contact therewith. After the central portion of the collapsed midregion is reheated, the flow of oxygen to burner 34 is turned off and stages 45 and 46 pull in opposite directions until the coupler length has been increased by an amount necessary to reduce the radial distance between the cores of fibers 19 and 20 along a longitudinal distance sufficient to accomplish a predetermined type of coupling. The diameter of the central portion of midregion 27 is reduced as illustrated by region 51 of FIG. 5. Drops 52 of glue can be applied to the ends of the coupler to provide a hermetic seal.

The amount of stretching to which the coupler preform must be subjected to achieve a given type of coupler is initially determined by injecting light energy into input fiber 19 of a coupler preform and monitoring the output power from at least one of the output fibers 20 during the stretch operation. The detection of a predetermined output power from the output fiber can be used as an interrupt to cause stages 45 and 46 to stop pulling the preform. In this case, the predetermined output power would be 1/16 the input power minus 1/16 the total excess device loss, as determined empirically. After having determined the proper stretching distance to achieve predetermined coupling characteristics, the apparatus can be programmed to move the stages that proper stretching distance during the fabrication of subsequent couplers that are to have said predetermined characteristics.

When the input fiber and the sixteen output fibers are identical, the percent power coupled from the input fiber to the output fiber will be wavelength sensitive. In the above-described example, about 1/16 the input power might couple to each of the output fibers at a predetermined wavelength such as 1310 nm, whereas substantially no power would couple at another wavelength such as 1550 nm. However, if the propagation constants of the output fibers are different from that of the input fiber, the device can be made to function as an achromatic coupler, a wavelength division multiplexer or the like. Various fiber parameters that affect the propagation constant are disclosed in the publication: O. Parriaux et al., "Wavelength Selective Distributed Coupling Between Single Mode Optical Fibers for Multiplexing", Journal of Optical Communications, Vol. 2, No. 3, pp. 105-109.

In the embodiments of FIGS. 6-9 the gap is azimuthally inhomogeneous, i.e. the thickness thereof at spaced azimuthal positions is sufficient to accept one of said plurality of output fibers, but the thickness thereof between said spaced azimuthal positions is insufficient to accept one of said plurality of output fibers. An azimuthally inhomogeneous gap is useful for forming 1×N couplers of the type wherein N is relatively small, i.e. wherein N is as small as 3. It is noted that if a 1×8 coupler were being formed in accordance with the example of FIGS. 1-3, tube 10 would have an inordinately small thickness and would therefore be difficult to handle. However, a 1×8 coupler, for example, can be made in accordance with the embodiment of FIG. 6 wherein circularly cylindrical inner tube 57 is provided with an axial aperture 56 into which input fiber 55 is disposed. Outer tube 58 has an aperture 59 containing inwardly projecting, equally spaced, longitudinally extending protrusions 60 that are equal in number to the number of output fibers 61 (8 in this embodiment). Aperture 59 can be formed by shrinking tube 58 onto an appropriately shaped carbon member as described above. Fibers 61 are separated by protrusions 60, thereby permitting the use of a tube 57 of greater diameter than that which would have been required if fibers 61 were disposed in a close packed array wherein adjacent fibers were in contact. Projections 60 also eliminate any skew in the orientation of fibers 61, and thereby maintain fibers 61 in parallel relationship with respect to fiber 55.

Figure 7:
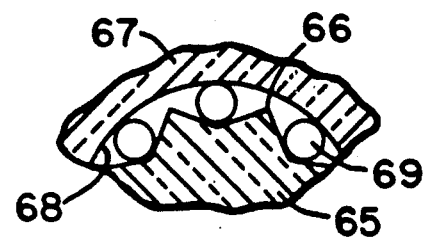

In the embodiment of FIG. 7, inner tube 65 contains longitudinally extending protrusions 66, whereas outer tube 67 has a circular aperture 68. In a modifications of FIG. 7 (not shown), outer tube 67 could also have inwardly extending projections aligned with projections 66. It is more difficult to form the projections on the outer surface of a tube than on the aperture surface. Projections 66 could be formed by machining the glass tube prior to reducing its diameter by drawing.

Figure 8:
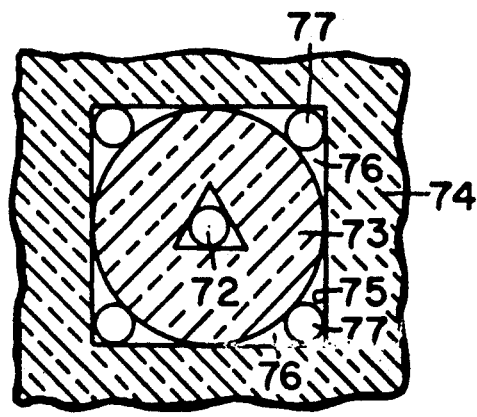

A spacing member between the input and output fibers could also be employed with as few as two or three output fibers. In FIG. 8, input fiber 72 is disposed in the aperture of circular tube 73. Tube 73 is disposed within outer tube 74 having a square aperture 75 that is just large enough to permit the insertion of inner tube 73. Output fibers 77 fit snuggly within the four enlarged regions of the gap 76 that exists between the two tubes.

Figure 9:
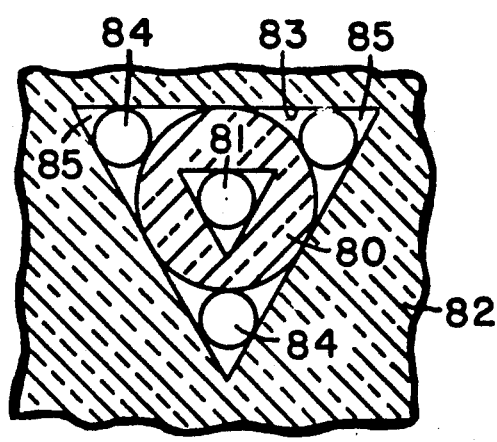

In the embodiment of FIG. 9, circular tube 80, in which there is disposed an input fiber 81, is positioned within the triangularly shaped aperture 83 of tube 82. Output fibers 84 fit snuggly within the three enlarged regions of the gap 85 that exists between the two tubes.

We claim:

1. A method of making a fiber optic coupler comprising the steps of
    assembling a coupler preform having inner and outer concentric glass tubes having a gap therebetween said coupler preform having a midregion, a first optical fiber disposed in the aperture in said inner tube, a plurality of optical fibers disposed within said gap and equally spaced about the axis of said inner tube, said first fiber and said plurality of fibers extending through the midregion of the resultant coupler preform,
    collapsing the concentric glass tubes of said coupler preform at said midregion onto said fibers, and
    stretching the central portion of said midregion to reduce the diameter thereof wherein said collapsing and said stretching position said optical fibers to provide coupling of optical transmissions in said first fiber with said plurality of fibers.

2. A method in accordance with claim 1 wherein the step of assembling a coupler preform comprises assembling a preform wherein each of said plurality of fibers is disposed immediately adjacent two other of said plurality of fibers.

3. A method in accordance with claim 1 wherein the step of assembling a coupler preform comprises assembling a preform wherein said gap is azimuthally homogeneous, whereby its thickness at any azimuthal position is sufficient to accept one of said plurality of fibers.

4. A method in accordance with claim 1 wherein the step of assembling a coupler preform comprises assembling a preform wherein said gap is azimuthally inhomogeneous, whereby the thickness thereof at equally spaced azimuthal positions is sufficient to accept one of said plurality of fibers, but wherein the thickness of said gap between said spaced azimuthal positions is insufficient to accept one of said plurality of fibers.

5. A method of making a fiber optic coupler comprising the steps of
    providing an inner glass tube having first and second ends and an axially disposed aperture,
    inserting a portion of a first optical fiber into said axially disposed aperture, the remainder of said first fiber extending from said first end of said inner tube,
    providing an outer glass tube having an aperture,
    inserting said inner tube into the aperture of said outer tube, a gap existing between said inner and outer tubes,
    inserting the ends of a plurality of optical fibers into said gap, the device so formed constituting a coupler preform, said coupler preform having a midregion, said first fiber and said plurality of fibers extending through the midregion of said coupler preform,
    collapsing said glass tubes of said coupler preform at said midregion onto said fibers, and
    stretching the central portion of said midregion to reduce the diameter thereof wherein said collapsing and said stretching position said optical fibers to provide coupling of optical transmissions in said first fiber with said plurality of fibers.

6. A method in accordance with claim 5 wherein the steps of providing inner and outer tubes comprises providing tubes that are so constructed that said gap is azimuthally homogeneous, whereby its thickness at any azimuthal position is sufficient to accept one of said plurality of fibers, the step of inserting said plurality of fibers resulting in a fiber array wherein each of said plurality of fibers is disposed immediately adjacent two other of said plurality of fibers.

7. A method in accordance with claim 5 wherein the step of providing inner and outer tubes comprises providing tubes that are so constructed that said gap is azimuthally inhomogeneous, whereby the thickness thereof at equally spaced azimuthal positions is sufficient to accept one of said plurality of fibers, but wherein the thickness of said gap between said spaced azimuthal positions is insufficient to accept one of said plurality of fibers.

8. A method in accordance with claim 5 wherein the step of providing an outer tube comprises providing a tube having a circularly cylindrical aperture.

9. A method in accordance with claim 5 wherein the step of providing an outer tube comprises providing a tube, the aperture of which contains a plurality of equally spaced, inwardly projecting, longitudinally extending protrusions, and the step of inserting said plurality of fibers comprises inserting one of said plurality of fibers into said gap between each of said protrusions.

10. A method in accordance with claim 5 wherein the step of providing an inner tube comprises providing a tube, the outer surface of which contains a plurality of equally spaced, outwardly projecting, longitudinally extending protrusions, and the step of inserting said plurality of fibers comprises inserting one of said plurality of fibers into said gap between each of said protrusions.

11. A method in accordance with claim 5 wherein the step of providing an inner tube comprises providing a tube having a circularly cylindrical outer surface and wherein the step of providing an outer tube comprises providing a tube, the aperture of which is formed of a plurality of surfaces equal in number to said plurality of fibers, the cross-sectional configuration of said outer tube aperture being that of a regular polygon.

12. A method in accordance with claim 5 wherein said plurality of fibers each comprises a glass core surrounded by a glass cladding having a refractive index lower than that of said glass core, and wherein the step of providing an inner tube comprises providing a tube formed of a glass having a softening point temperature lower than that of said glass cladding and having a refractive index substantially equal to that of said glass cladding.

13. A method in accordance with claim 12 wherein the step of providing an outer tube comprises providing a tube formed of a glass having a refractive index less than that of said glass cladding.

14. A method in accordance with claim 13 wherein the step of providing an outer tube comprises providing a tube formed of a glass having a softening point temperature lower than that of said inner tube.

15. A method in accordance with claim 5 wherein the step of providing an inner tube comprises providing an inner tube that is longer than said outer tube, wherein the step of inserting said inner tube into the aperture of said outer tube results in a coupler preform wherein said second end of said inner tube extends beyond said outer tube, said method further comprising the step of bonding said plurality of fibers to the protruding portion of said inner tube.

16. A method in accordance with claim 15 wherein said plurality of glass fibers have coatings thereon, said method further comprising the step of stripping from an end of each of said plurality of fibers a portion of the coating thereof, and wherein the step of inserting the ends of a plurality of optical fibers into said gap results in the formation of a coupler preform wherein the coated portions of said plurality of fibers terminate beyond said second end of said inner tube.

* * * * *